Nov. 4, 1952 — L. B. GRIFFITH — 2,616,848
SEWAGE TREATMENT

Filed Oct. 17, 1947 — 2 SHEETS—SHEET 1

Inventor:
Llewellyn B. Griffith
By Henry H. Snelling
his Attorney

Inventor:
Llewellyn B. Griffith
By Henry H. Snelling
his Attorney

Patented Nov. 4, 1952

2,616,848

UNITED STATES PATENT OFFICE 2,616,848

SEWAGE TREATMENT

Llewellyn Brooks Griffith, Austin, Tex.

Application October 17, 1947, Serial No. 780,546

1 Claim. (Cl. 210—2)

This invention relates to sewage treatment and has for its principal object the provision of a simple and efficient unit particularly suitable for very small installations.

An important feature of my invention is the placing of a contact aerator over the primary tank sludge hopper this having the effect of permitting the carrying on of the primary and secondary actions in a single tank thus lessening the load on the second stage as well as making for greater economy by the consequent saving of piping, solenoid valves and clock mechanism.

An important object of the invention is to arrange both the primary settling and the biological secondary treatment so they can be placed in a single tank. This increases the settling tank efficiency and thereby reduces the amount of work to be accomplished by the more expensive biological methods. In such a manner the solids from the primary treatment and the secondary treatment can both easily be removed from a combined sludge hopper by a single sludge removal line operated automatically.

Further objects of the invention are to provide systems of sewage treatment in which the efficiency of the primary treatment is increased by causing flocs to carry down with them extremely small particles of solid matter; to operate the primary and secondary treatments in a single tank and to prevent the settling conditions from becoming toxic and thereby injuring the healthful sewage organisms clinging to the separator plates or contact surfaces.

Still another object of the invention is to provide an improved sewage treatment method which includes a single chamber wherein primary settling of the raw sewage is accomplished more efficiently and wherein biological treatment is also accomplished by means of a contact aeration unit which coagulates and precipitates by biological means the solids in the form of flocs which entraps and hence greatly facilitates the settling of small or even colloidal particles which would otherwise exert a load upon the secondary process.

Briefly, my system consists in flowing the raw sewage into a settling tank at the far side of which I have arranged a biological treatment unit, flowing air upwardly through a series of plates or other suitable surfaces in such fashion that the liquid is constantly re-cycled through the plates many times before it spills over a weir into a second stage at the rate of flow of the incoming raw sewage. The heavier solids will gravitate to the hoppered bottom of the tank and will be drawn off in spaced and very short periods, at intervals of from one to five hours. The lighter solids, which in an ordinary settling tank would spill over the weir, are consequently caught by the flocs passing downwardly through the secondary treatment unit and thus these smaller solids will be carried down to the same hoppered bottom of the same tank. All settled solids rapidly become septic and if the putrefaction cycle continues without oxygenation toxic liquids are formed which are extremely difficult to treat by aerobic biological methods. Fortunately the septic sludge forms gas bubbles which cause the sludge to rise in large masses and in the apparatus of the present invention these rising masses of sludge pass through the streams of air from the air diffusers which break up the sludge masses, release the gas bubbles and then oxygenate the solids in the contact aerator so that these solids will readily resettle into the same hopper before they have progressed to the very detrimental toxic stage.

The net result of settling these extra solids in the first tank is to place a much lighter load on the secondary treatment in the first tank and, of course, likewise to lessen the load on the second stage which, in turn, consists of a settling tank having a final biological treatment stage which feeds to the discharge opening or pipe through a filter which mats itself with algae (as in nature) and is, therefore, a true biological filter.

As will be noted from the above, there will be no bulking or burping of the septic sludge from the first chamber into the second chamber because the air in the first chamber breaks up the sludge and throws it to the bottom of the tank where it is removed mixed with the heavier and quicker settling material so there will be no formation of toxic liquids.

Figure 1:
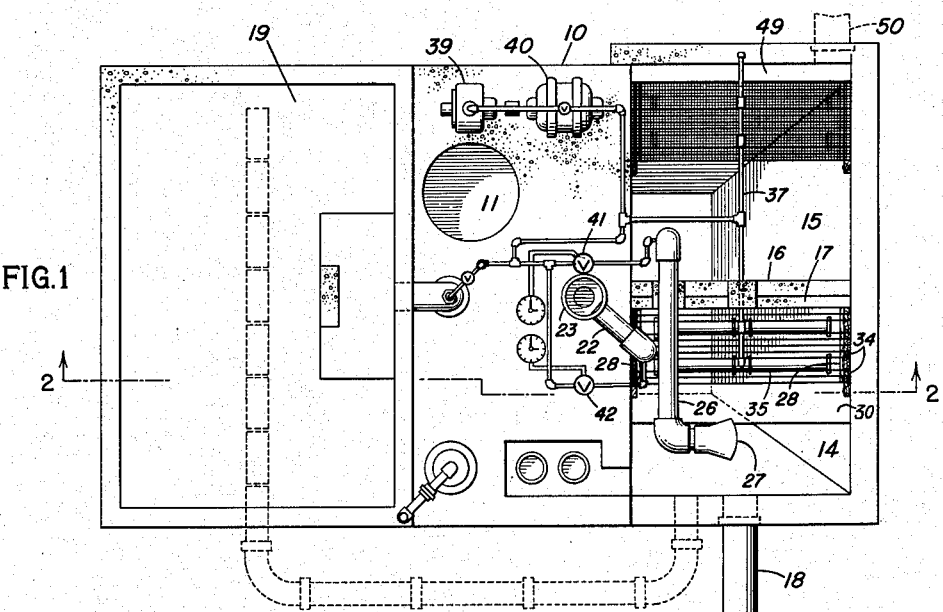
Figure 1 is a plan view of a device employing my invention.
Figure 2:
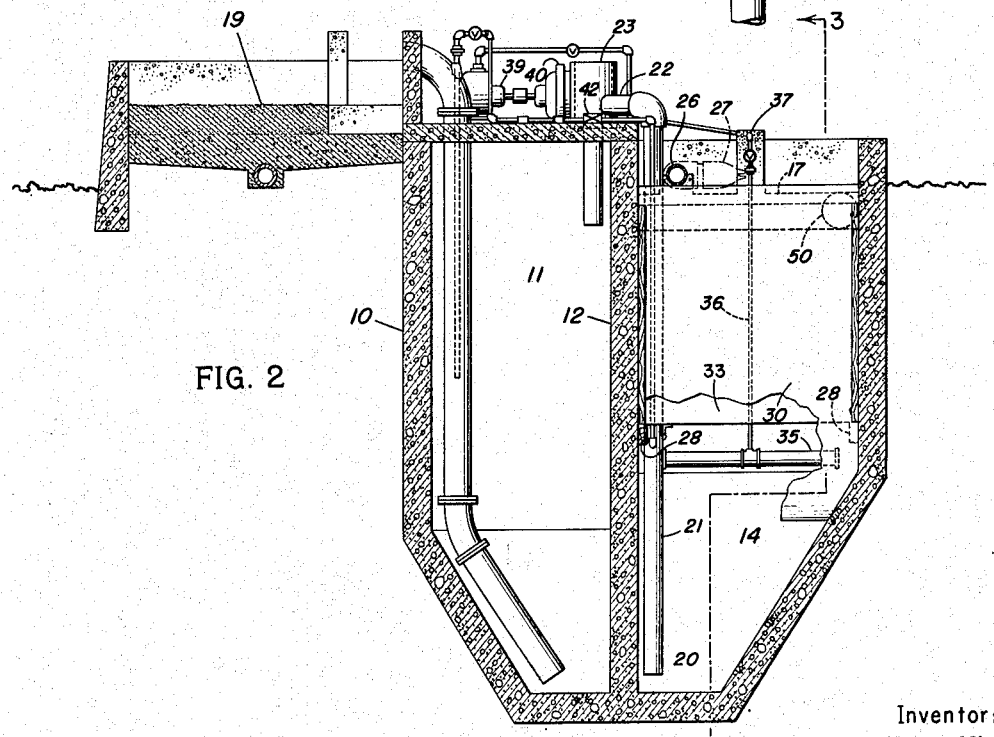
Figure 2 is a vertical section taken on line 2—2 of Figure 1.

Referring primarily to the plan view, Figure 1, my device includes a tank 10, providing a digester chamber 11, generally of conventional type and separated by a heat transfer common wall 12 from a sewage treatment unit consisting of a first chamber 14 and a second chamber 15, separated by a wall 16 having at its top a weir 17 over which the liquid flows from chamber 14 to chamber 15 over the top of weir 17 in accordance with entry of material through the entrance pipe 18. To the left of tank 10 is a sludge drying bed 19 of any conventional type.

While my device may have a sieve of any type and a baffle near the point of discharge of the pipe 18 into chamber 14, I find that I can readily omit these two well-known items and discharge directly into the settling tank which is the chamber 14. The sewage reaching this settling tank slowly settles its larger solids which fall to the hoppered bottom 20 from whence they are drawn at intervals of about one, two, three or four hours, depending upon the amount and septicity of the sludge, through a lift or air pump 21 which discharges thru a horizontal pipe 22 to an air vent 23 of well-known form. The settling tank 14 discharges over wier 17 to the second stage treatment tank 15.

An air pump 25 in the second stage tank 15 operates consecutively with air pump 21 both being about the same size which would be say 4". The plant illustrated with the digester is roughly 8' x 8' x 8' in size but the invention contemplates sizes of from 40 persons up to plants for thousands. The air pump 25 discharges thru a horizontal pipe 26 to a spray-head 27, the net result being that the slight amounts of solids taken from the bottom of the second stage are returned to the primary tank 14 for resettling in the first stage bottom.

A preferred method would be to operate the air lift 25 for say 15 minutes and then after giving the material an hour and a half or more time to resettle in the sludge hopper of the primary settling tank so that all the solids from the plant are concentrated into one hopper. These solids are withdrawn thru the air lift 21 and discharged into the sludge digestion tank 11. As will be understood, the pump 21 would only work for a minute or so as it is highly desirable that the amount of liquid taken from the settling tank to the digester be at a minimum while taking as great a part of the solids as is possible.

Figure 3:
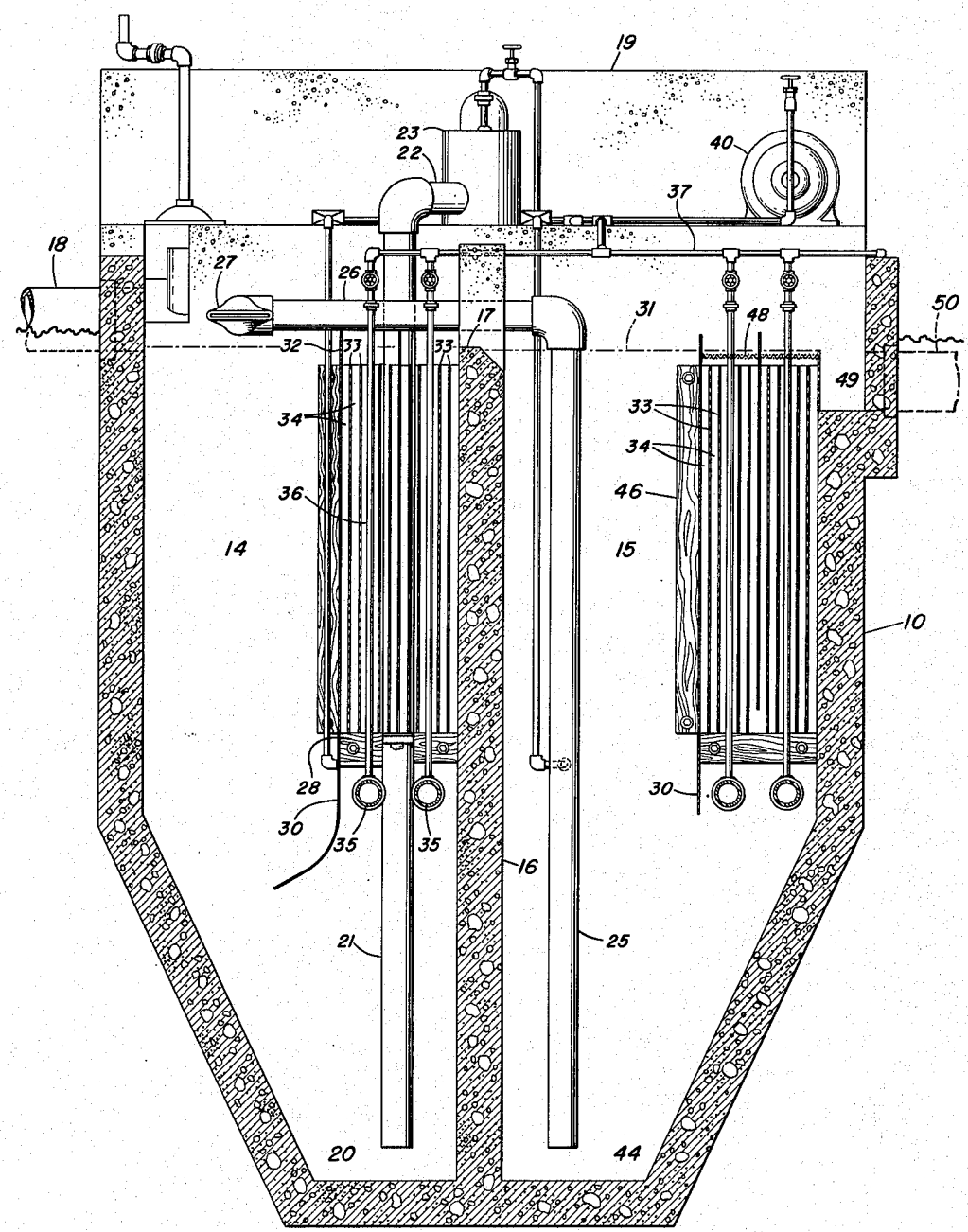
Figure 3 is a vertical section approximately at right angles to Figure 2 and taken on line 3—3 of Figure 2.

Referring particularly to Figure 3, supporting ledges 28 are provided on two opposite walls of the tank 14. These ledges may readily be single two by fours. At the influent end the baffle 30 extends well above the water level 31, as indicated at 32, and is caulked along the vertical edge. Between the permanent baffle 30 and the wall 16 dividing the chambers 14 and 15 I arrange a plurality of contact plates 33 which in an installation of this size would be say 4 ft. square and spaced apart about an inch. The plates 33 can be any shape or of any material such as aluminum, wall-board or any material that provides passage of the sewage and has a surface to which the aerobic sewage organisms will cling. The plates are separated by spacers 34 nailed or otherwise secured to each plate. Consequently any plate can be removed without disturbing the others.

Under all of the plates but slightly above the bottom of baffle 30 I arrange two porous air diffuser tubes 35 which receive air through vertical pipes 36 and header 37 which receive their air supply from a blower 39, driven by a relatively small motor 40. The air blower 39 furnishes all of the air for the system and altho it furnishes air constantly to the diffuser tubes which feed the air almost entirely in an upward direction, this supply is constant whereas the air supplied to the pumps 21 and 25 is supplied only intermittently. Consequently I employ for each of the air lifts a clock-operated solenoid valve 41 for control of the air pump 25 and a similar device 42 for control of the air lift 21 in the settling tank 14.

When no air is being used the normal flow of the sewage from the bottom of the contact aeration plates to the top would take place in about twenty minutes but when the air diffusers increase, the upward velocity causes the sewage to rise from the air diffusers to the level of the liquid in about four seconds time. Inasmuch as liquid can not move from the tank 14 to the tank 15 at any rate other than at the rate of flow of the volume of the new material added through pipe 18, this quick raising of the material in the biological contact aerator cell causes a rapid up and down cycling of the sewage between the several surfaces at a rate about 300 times faster than if there were no air propelling effect from the air diffusers.

As this material descends between the surfaces in this secondary treatment unit it carries with it a biological floc which forms a blanket below the unit at the depth of the bottom of baffle 30 where the descending solids are coming from the initial settling, and since this material is flocculent and aerated it entraps or attaches to itself the very fine solids which do not readily settle by gravity and in this way settle many small solids which would not ordinarily settle at all. By taking out these extremely fine solids we minimize the organic load on the biota in the aerator. Expressed in other words, these solids which are already septic or which will soon become septic are settled out and can be removed to the sludge digester; otherwise they would impose an additional load on the subsequent biological treatment. This removal of normally unsettleable solids of course greatly increases the efficiency of the treatment plant.

The material passing over wier 17 from chamber 14 to chamber 15 settles in the latter and whatever solids there may be fall to the bottom 44 of tank 15 and are drawn, as previously explained, upwardly through the air pump 25 and discharged through the spray-head 27 on the top of liquid in tank 14 which periodically agitates the surface of the liquid in tank 14 and in this way breaks up any masses of sludge or scum which have become gaseous so that it will release the gas bubbles and permit it to resettle to the bottom 20.

The biological treatment unit 46 in tank 15 to the right of Figure 3 is identical with the similar unit in the secondary unit in tank 14 with the exception that it is not necessary to place it immediately over the hopper bottom due to the normal aerobic conditions in 14 and the fact that considerable aerobic floc is carried over the wier from the first aerator. On top of this unit I place a quarter inch mesh wire screen between the tops of plates 33 and the water level 31. This screen 48 acts as a natural biological filter because its size is such that it collects the algee which mat and form a highly efficient filter returning undesirable constituents to the biological treatment unit and allowing only the relatively pure water to pass to the discharge chanel 49 and the exit pipe 50.

The operation of my device is as follows, referring particularly to Figure 3: The raw sewage enters at 18, the larger masses settle to the left of chamber 14 and these gravitate by reason of the hoppered bottom to a point directly under the secondary stage. The secondary treatment unit has a liquid volume sufficient to provide an average detention period of from 15 to 60 minutes, depending on the spacing of the biological surfaces. Air is provided below the contact surfaces in amounts sufficient to oxygenate the liquid in the aerator to not less than about two parts per million of dissolved oxygen or adequate amount for sustaining active aerobic life. The upward and downward flow of sewage between the biological surfaces not only greatly increases the intimate contact period between the liquid and the biological organisms, but agitates the growth in such manner that it is able to spread out from the plates in a horizontal direction. The continuous unloading of the slimes and biological growth causes a floc to be formed. As these flocs settle downward they entrap with them many small organic solids which otherwise would not settle at all. When the masses of solids settle in chamber 14 and are carried to the right, as seen in Figure 3, they become septic after a few hours and undergo anaerobic decomposition. This results in the formation of gases and if allowed to continue long enough would result in the formation of toxic liquids which are extremely difficult to treat by the ordinary aerobic biological methods. When this septic gas first forms, large masses of septic sludge in the hopper bottom are carried upward by the entrapped gas bubbles but since the flat or horizontal hopper bottom is directly below the secondary stage, these rising masses are aerated and agitated as they are rapidly carried upward. In this way the gas bubbles are released and the septic solids are blanketed with the settling aerobic flocs and are returned to the hopper bottom before the anarobic action has progressed far enough for the extremely septic liquids to become toxic and hence detrimental to all forms of aerobic biological treatment.

Material passing over the wier 17 in the center of the figure at the top pass to the second stage and what slight amounts of solids do pass over are lifted from time to time by the air pipe 25 and returned to the primary settling chamber 14. The effluent after passing through the biological treatment unit 46 is discharged through channel 49 at the right of the figure.

In the claim a biological treatment unit is intended to cover a unit in the path of the sewage including appropriate organisms in an environment suitable for their functioning to the end that they may purify the sewage. The environment would necessarily include surfaces to which the organisms might cling and the presence of oxygen.

What I claim is:

In a sewage treatment plant, a tank having parallel walls, a middle partition extending from one tank wall to the opposite parallel wall to divide the tank into a digester chamber on one side of the partition and a raw sewage treatment chamber on the opposite side of the partition, the entire length of the partition being in contact with raw sewage on one side and the entire length of the partition being in contact with the digester chamber on the other side, said partition being of such thickness and material as readily to transfer heat from the warmer incoming sewage to the cooler digesting sludge, whereby anaerobic action in the digester chamber is speeded up.

LLEWELLYN BROOKS GRIFFITH.

REFERENCES CITED

The following references are of record in the file of this patent:

UNITED STATES PATENTS

| Number | Name | Date |
|---|---|---|
| 1,139,024 | Frank | May 11, 1915 |
| 1,399,561 | Imhoff et al. | Dec. 6, 1921 |
| 1,642,206 | Imhoff | Sept. 13, 1927 |
| 1,700,723 | Imhoff | Jan. 29, 1929 |
| 1,717,780 | Imhoff | June 18, 1929 |
| 1,893,623 | Imhoff | Jan. 10, 1933 |
| 2,008,507 | Laughlin | July 16, 1935 |
| 2,348,125 | Green | May 2, 1944 |
| 2,389,357 | Griffith | Nov. 20, 1945 |
| 2,413,838 | Mallory | Jan. 7, 1947 |
| 2,427,886 | Walker | Sept. 23, 1947 |
| 2,458,163 | Hays | Jan. 4, 1949 |